US008955655B2

(12) United States Patent
Von Allmen et al.

(10) Patent No.: US 8,955,655 B2
(45) Date of Patent: Feb. 17, 2015

(54) DEVICE FOR THE IMPACT DAMPING OF CABLE CONSTRUCTIONS, IN PARTICULAR FOR BARRIER STRUCTURES FOR FALLING ROCK, MUD FLOWS AND SNOW

(75) Inventors: Hans Peter Von Allmen, Tafers (CH); Andrea Roth, Egnau (CH)

(73) Assignee: Geobrugg AG, Romanshorn (CH)

( * ) Notice: Subject to any disclaimer, the term of this patent is extended or adjusted under 35 U.S.C. 154(b) by 425 days.

(21) Appl. No.: 12/992,713

(22) PCT Filed: May 8, 2009

(86) PCT No.: PCT/CH2009/000151
§ 371 (c)(1),
(2), (4) Date: Dec. 7, 2010

(87) PCT Pub. No.: WO2009/013795
PCT Pub. Date: Nov. 19, 2009

(65) Prior Publication Data
US 2011/0067966 A1 Mar. 24, 2011

(30) Foreign Application Priority Data
May 16, 2008 (CH) ........................ 0746/08

(51) Int. Cl.
F16F 7/12 (2006.01)
E01F 7/04 (2006.01)
F16G 11/12 (2006.01)

(52) U.S. Cl.
CPC ................ *E01F 7/045* (2013.01); *F16G 11/12* (2013.01)
USPC ....................................... 188/376

(58) Field of Classification Search
CPC ........ E01F 7/045; F16G 11/12; F16G 11/101; F16G 11/103; F16F 7/12; F16F 7/128
USPC .................. 188/371, 373, 374, 376; 293/124; 244/110 C, 110 R, 110 F
See application file for complete search history.

(56) References Cited

U.S. PATENT DOCUMENTS 1,451,493 A * 4/1923 Cruickshank ............. 244/110 A
3,087,584 A * 4/1963 Jackson et al. ................ 188/372
3,750,612 A * 8/1973 D'Agostino, Jr. ........ 114/221 R
(Continued)

FOREIGN PATENT DOCUMENTS

DE 102005053710 A1 * 12/2006
GB 2325455 A * 11/1998

*Primary Examiner* — Robert A Siconolfi
*Assistant Examiner* — Charles Poon
(74) *Attorney, Agent, or Firm* — Brian Roffe

(57) ABSTRACT

With an apparatus for the shock absorption of rope structures, in particular for rockfall, land slide and snow barriers, at least one intermediate piece (1; 1') deformable by tensile forces is provided which is accommodated within a rope subjected to tension. The intermediate piece (1, 1') comprises one or more longitudinal elements (7, 8, 20) which can respectively be in the form of a strip, bar, wire, rope and/or strand. The longitudinal element or elements (7, 8, 20) are connected by their one end (7a, 8a; 20a) to the one rope end. On the other hand, they are guided about a deflection element (10; 10') connected to the other rope end. Means are provided by means of which the deflection angle of the longitudinal element or elements formed upon loading the intermediate piece (1, 1') is substantially sustained. The shock absorption characteristics can thus be better defined and optimised.

19 Claims, 2 Drawing Sheets

(56) References Cited

U.S. PATENT DOCUMENTS

| | | | | |
|---|---|---|---|---|
| 4,304,320 A | * | 12/1981 | Hull | 188/371 |
| 4,618,026 A | * | 10/1986 | Olson | 182/4 |
| 4,730,810 A | * | 3/1988 | Rambaud | 256/12.5 |
| 4,753,772 A | * | 6/1988 | Schmertz | 376/285 |
| 5,799,760 A | * | 9/1998 | Small | 188/371 |
| 6,655,716 B2 | * | 12/2003 | Riefe | 280/777 |
| 6,769,715 B2 | * | 8/2004 | Riefe et al. | 280/777 |
| 2008/0136225 A1 | * | 6/2008 | Murphy et al. | 297/216.11 |

\* cited by examiner

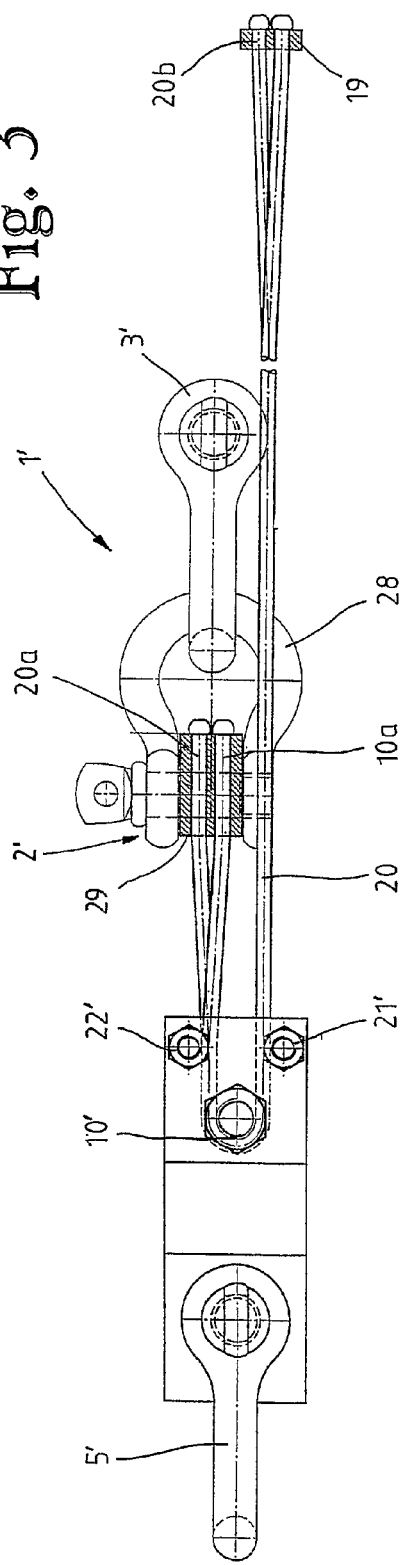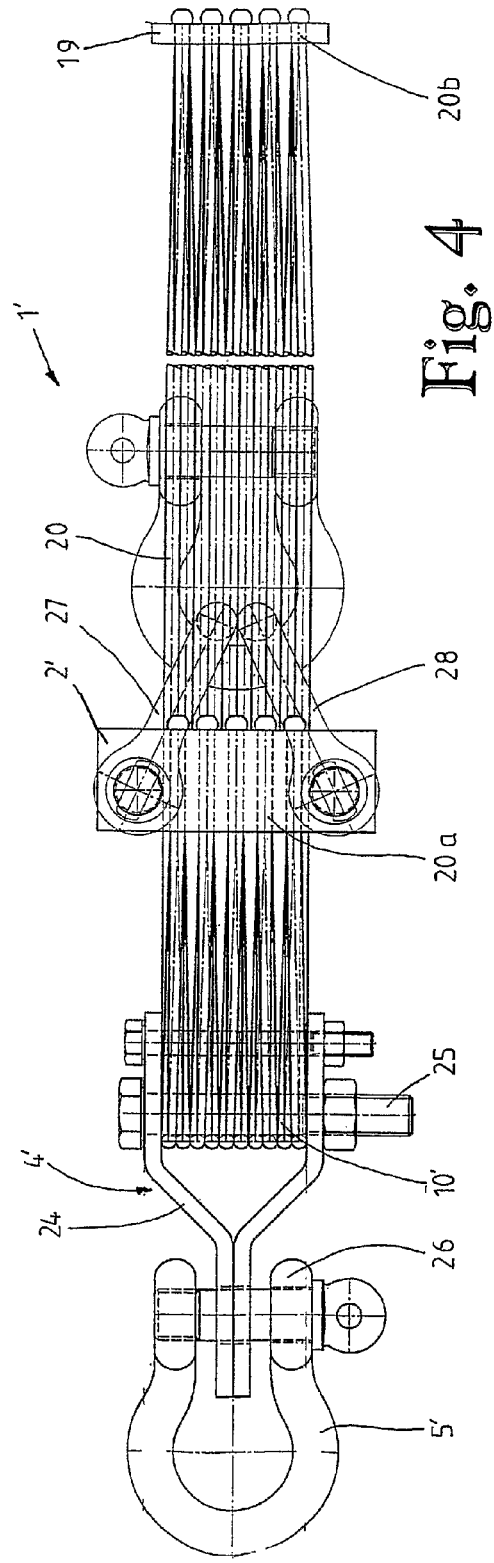

DEVICE FOR THE IMPACT DAMPING OF CABLE CONSTRUCTIONS, IN PARTICULAR FOR BARRIER STRUCTURES FOR FALLING ROCK, MUD FLOWS AND SNOW

FIELD OF THE INVENTION

The invention relates to an apparatus for the overload shock absorption of rope structures, in particular for rockfall, land slide and snow barriers, that have at least one intermediate piece deformable by tensile forces which is accommodated in a rope subject to tension.

BACKGROUND OF THE INVENTION

An apparatus of this type is disclosed in CH-PS 659 299. It comprises an intermediate piece integrated into the rope line and deformable by tensile forces, which is bent to form a ring and stretched when loaded. The shock absorption characteristics of this apparatus show variations which can not be tolerated with very precise applications.

OBJECTS AND SUMMARY OF THE INVENTION

The object which forms the basis of the present invention is to provide an apparatus of the type specified at the start with which the shock absorption characteristics can be better defined and optimised and, moreover, are more repeatable.

This object is achieved according to the invention by an apparatus in which the intermediate piece includes one or more longitudinal elements that can respectively be in the form of a strip, bar, wire, rope and/or strand the at least one longitudinal element being connected at one end to one rope end, and being guided about a deflection element connected to the other rope end, means being provided to substantially sustain the deflection angle of the longitudinal element or elements formed upon loading the intermediate piece.

Further preferred embodiments of the apparatus according to the invention form the subject matter of the dependent claims.

According to the invention, an intermediate piece is incorporated into a rope subjected to tension, said intermediate piece having one or more longitudinal elements which are formed from strips, bars, wires, ropes or strands and/or combinations of the latter, one end of which is connected to one rope end and which are guided about a deflection element connected to the other rope end. The other end of the strips, bars, wires or strands is free, and the deflection angle is advantageously between 90 and 225°. Means are provided by means of which the deflection angle is substantially sustained when the intermediate piece is loaded.

Upon increasing the tensile load, the longitudinal elements are pulled over the deflection element (e.g. one or more deflection bolts), by means of their deformation and the friction the impact load acting on the rope, due for example to falling rocks or snow, being cushioned, and the kinetic energy to be contained being absorbed. Here the shock absorption characteristics can be influenced in a desired way, for example by varying the number, the thickness or the width of the strips, the form of these longitudinal elements, the material properties (e.g. strength, yield strength, elasticity modulus) or by varying the number or the thickness of the bars, wires or strands over the length.

Corresponding apparatuses are also possible however, where by means of a number of similar deflection processes the longitudinal elements can be deflected repeatedly, by means of which the energy absorption process can be intensified.

BRIEF DESCRIPTION OF THE DRAWINGS

In the following the invention is described in greater detail by means of the drawings. These show as follows:

FIG. 3 is a side view of a second exemplary embodiment of an apparatus according to the invention for the overload shock absorption for a rope subjected to tension; and FIG. 4 is a top view of the apparatus according to FIG. 3.

DETAILED DESCRIPTION OF THE INVENTION

Figure 1:
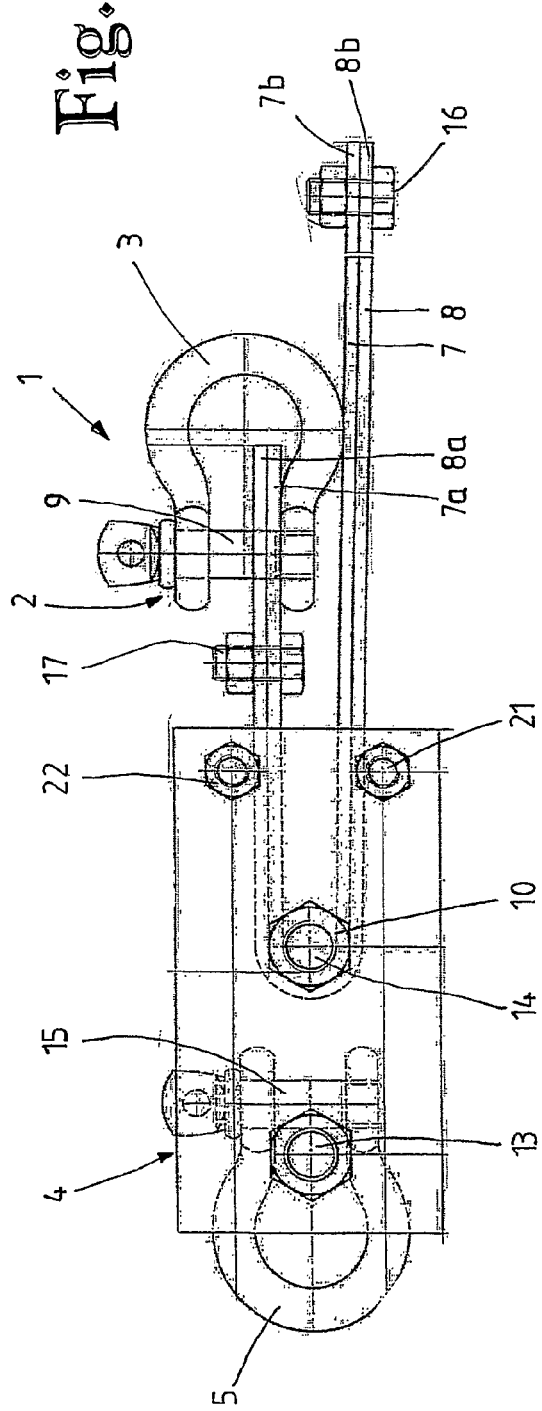
FIG. 1 is a side view of a first exemplary embodiment of an apparatus according to the invention for the overload shock absorption for a rope subjected to tension.
Figure 2:
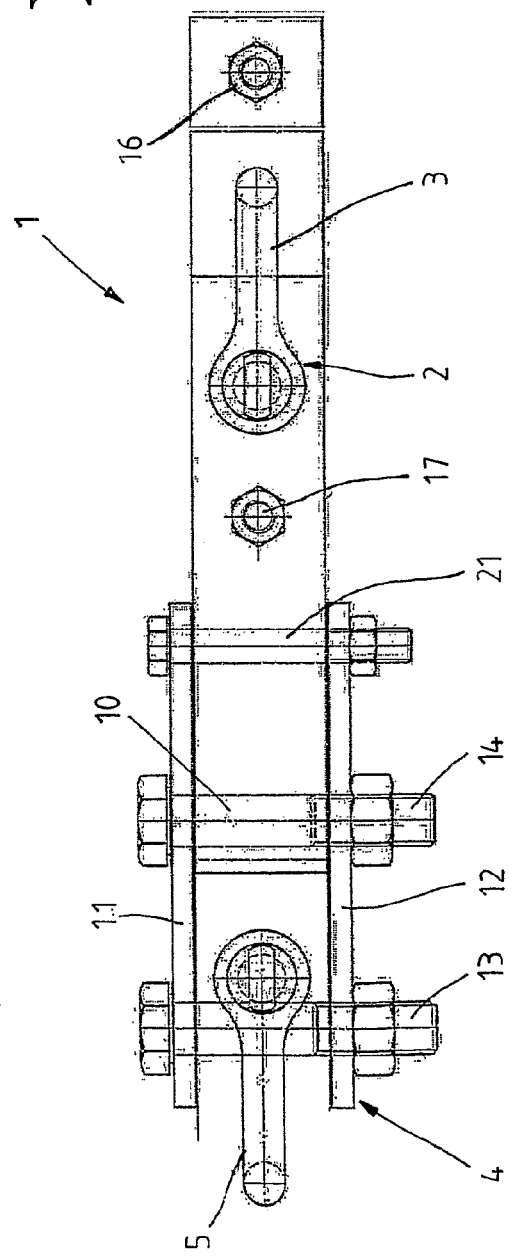
FIG. 2 is a top view of the apparatus according to FIG. 1.

In FIGS. 1 and 2, an intermediate piece 1 for an apparatus for the overload shock absorption of rope structures, in particular natural threats such as for example for rockfall, land slide and snow barriers, is illustrated which is incorporated into a rope subjected to tension in order to cushion the impact load to which the rope is subjected with increased tensile loading, for example due to falling rocks or snow, and to break down kinetic energy, it being possible to make full use of the strength of the rope. Rope structures, in particular for rockfall, land slide and snow barriers have at least one intermediate piece deformable by tensile forces which is accommodated in a rope subjected to tension. Further areas of application are possible for systems and apparatuses where kinetic energies from masses are to be absorbed by dynamic deceleration processes.

The intermediate piece 1 has a first connection piece 2 with a shackle 3 to which the rope, not visible in the drawing, is attached to a tension, attachment element or rope end. The other tension, attachment element or rope end is connected to a shackle 5 of a second connection piece 4. Instead of shackles, other connection pieces can also be used as connection elements.

With the exemplary embodiment shown in FIGS. 1 and 2, according to the invention the intermediate piece 1 comprises two strips or flat bars 7, 8 laid over one another as longitudinal elements which are attached in the first connection piece 2 to one end 7a, 8a by means of a threaded bolt 9 locking the shackle 3. The second connection piece 4 comprises two plates 11, 12 which are connected to one another by means of screws 13, 14 and are held a distance apart corresponding to the width of the strip. Whereas the one screw 13 is assigned to the shackle 5 and to its threaded bolt 15, the other screw 14 forms a deflection bolt 10 about which the strips 7, 8 are guided. Instead of the screw connections, corresponding welded connections are also possible. The deflection angle is preferably at least approximately 180°.

The strips 7, 8 secured to the one end 7a, 8a in the first connection piece 2 are free at the other end 7b, 8b. In this end region the strips 7, 8 are connected to one another by means of a screw 16, a screw 17 also connecting the strips 7, 8 in the initial region with the first connection piece 2.

Furthermore, the second connection piece 4 is provided with two guide bolts 21, 22 parallel to the deflection bolt 10 for the deflected strips 7, 8 which are arranged offset in relation to the deflection bolt 10 towards the free end 7b, 8b or the first connection piece 2, rest on the outer strip 8, and which ensure that the deflection angle is sustained upon loading the intermediate piece 1. Of particular significance is the guide bolt 21 securing the free ends 7*b*, 8*b* in their position, but the presence of two guide bolts 21, 22 is advantageous.

The strips 7, 8 are preferably made of a raw steel, a weather-proof steel (Corten), a galvanised steel or a stainless steel, but they could also be made of a non-ferrous metal, preferably zinc, copper or alloys of the latter.

However, the corrosion protection can also be achieved by appropriate coatings (e.g. duplex coating or powder coatings) or other surface treatments.

Moreover, surface treatments can be implemented as embossing, roughening, lubrication etc. of the longitudinal elements and/or of the deflection bolts which essentially change the adhesion and sliding friction processes in the apparatus, by means of which the deceleration characteristics can be adapted to specific characteristics.

Likewise, embodiments made of non-metallic materials are possible, such as for example the use of special synthetics which absorb energy when deformed or combinations of these materials.

With increased tensile loading the strips 7, 8 connected to the one rope end via the shackle 3 are pulled over the deflection bolt 10. Due to the deformation of the strips 7, 8 and the friction, the impact load acting on the rope is cushioned and the kinetic energy to be contained, e.g., with rock impact, is absorbed.

It is by all means possible to use just one longitudinal element. By using two or more longitudinal elements lying over one another, the effect can, however, be considerably intensified.

With the intermediate piece 1 according to the invention comprising at least one strip, the shock absorption characteristics can be optimised, for example by varying the number, the thickness or the width of the strips over the length.

For example, provision can be made for a gentle start-up of the cushioning process by a strip thickness which continuously increases over a specific strip length towards the free end and/or strip thickness being chosen.

For the same purpose the strip or the strips can also be pre-bent with an initial bend diameter which is greater than the diameter of the deflection bolt 10.

It is also possible to reduce the strength of the strip or the strips in the initial region by thermal pre-treatment.

Instead of a strip or a number of strips, individual or a number of longitudinal elements disposed next to one another can also be used as deformation elements (the materials could be the same as the already mentioned strip materials).

In FIGS. 3 and 4 a further exemplary embodiment of an intermediate piece 1' is shown which in turn, for insertion into a rope, has a first connection piece 2' in which the wires 20 (or bars or strands) provided as longitudinal elements are attached to one end 20*a*, and a second connection piece 4' with a deflection bolt 10', the connection pieces 2', 4' in turn each being provided with a shackle 3', 5' for attaching the rope ends. The free ends 20*b* of the wires 20 in turn guided about the deflection bolt 10' with a deflection angle of approx. 180° are combined in an end stop 19. (With the embodiment according to FIGS. 1 and 2 an end stop can also be provided or be formed by the screw 16).

The deflection bolt 10' is formed by a screw 25 assigned to a fork-shaped part 24 of the second connection piece 4'. The fork-shaped part 24 is in turn provided preferably with two guide bolts 21', 22' parallel to the deflection bolt 10' which correspond in their positioning in relation to the deflection bolt 10' and their function to the guide bolts 21, 22 according to FIGS. 1 and 2 and from the outside rest on the wires 20 which extend in parallel. The fork-shaped part 24 is held by the threaded bolt 26 of the shackle 5'.

With the first connection piece 2' of the intermediate piece 1' two additional shackles 27, 28 are provided which connect the shackle 3' intended to attach the one rope end to a part 29 accommodating the wire ends 20*a* (see FIG. 3).

With this version of the apparatus according to the invention for the overload shock absorption of rope structures, in particular for rockfall, land slide and snow barriers, the shock absorption characteristics can also be optimised by varying the number or the thickness of the wires, bars or strands. Similarly to with the use of one or more strips, gentle start-up of the cushioning process can also be brought about here.

Needless to say the structural design of the connection pieces could differ from the embodiment shown, and instead of the deflection bolt 10 or 10' another deflection element could be used. Also, instead of the guide bolts 21, 22 and 21', 22' other means could be used in order to sustain the deflection angle when loading the intermediate piece. It is also conceivable to deflect the longitudinal elements about more than two deflection elements, whereby the longitudinal element or elements would be bent a number of times and so higher energy absorption would be made possible.

These deflection elements could also be in the form of bearings or be rotatable, by means of which the adhesion and/or sliding friction processes could likewise be essentially changed in the apparatus and the deceleration characteristics be adapted to specific characteristics. With a rotatable deflection element a desired reduction of the surface friction can be achieved. Likewise, this property can be influenced by a particular design of the surfaces of the longitudinal elements and of the deflection elements. Suitable for this purpose are for example lubricating coatings of the corresponding surfaces or those which reduce sliding friction.

Instead of screw connections between the intermediate pieces and the rope ends, alternative connections are also possible, such as for example a welded structure or reciprocal compression.

Optimisation of the cushioning characteristics can also be implemented by means of the material properties, e.g. strength, flow limit, elasticity modulus or similar.

The invention claimed is:

1. An apparatus for shock absorption of rope structures, comprising:
    at least one intermediate piece deformable by tensile forces and adapted to be associated with a rope subject to tension, said at least one intermediate piece comprising at least one longitudinal element, said at least one longitudinal element comprising at least one bar, each of said at least one longitudinal element having a first end region including a first end of said longitudinal element and a second end region including a second end of said longitudinal element;
    coupling means for coupling said first end region of said at least one longitudinal element to a first end of the rope, said coupling means comprising a connector connected to said first end region of said at least one longitudinal element;
    a single deflection bolt, said at least one longitudinal element having only a single bend between said first and second end regions of said at least one longitudinal element that is situated around said single deflection bolt such that said at least one longitudinal element has a first straight portion from said first end region to said deflection bolt and a second straight portion from said second end region to said deflection bolt;
    a first connection piece that couples said deflection bolt to a second end of the rope, said deflection bolt being attached to said first connection piece such that tension applied by the first end of the rope to said at least one longitudinal element is absorbed by said deflection bolt and transferred via said first connection piece to the second end of the rope; and sustaining means arranged on said first connection piece for sustaining a deflection angle of said at least one longitudinal element formed upon loading said at least one intermediate piece.

2. The apparatus of claim 1, wherein said connector comprises a threaded bolt.

3. The apparatus of claim 1, wherein said coupling means further comprise a shackle adapted to couple to the first end of the rope, said connector connecting said first end region of said at least one longitudinal element to said shackle.

4. The apparatus of claim 3, wherein said connector comprises a threaded bolt engaging with said shackle.

5. The apparatus of claim 1, wherein said coupling means further comprise a pair of shackles, said connector comprising a part that connects said first end region of said at least one longitudinal element to said pair of shackles.

6. The apparatus of claim 5, wherein said coupling means further comprise an additional shackle adapted to couple said pair of shackles to the first end of the rope.

7. The apparatus of claim 1, wherein said at least one longitudinal element comprises at least two bars laid over one another and guided about said deflection bolt.

8. The apparatus of claim 1, wherein said at least one longitudinal element comprises a plurality of bars.

9. The apparatus of claim 1, wherein said second end of said at least one longitudinal element is free, said sustaining means are configured to provide said at least one longitudinal element with straight portions between said sustaining means and said deflection bolt, and said sustaining means for sustaining the deflection angle sustain the deflection angle between 90° and 225°.

10. The apparatus of claim 1, wherein said at least one longitudinal element is made of steel, galvanized steel, stainless steel or a non-ferrous metal.

11. The apparatus of claim 1, wherein said coupling means further comprise a second connection piece for attaching said first end region of said at least one longitudinal element to the first end of the rope, said second connection piece comprising a first shackle.

12. The apparatus of claim 11, wherein said first connection piece further comprises a second shackle, said second shackle being arranged on one side of said deflection bolt and said sustaining means being situated on an opposite side of said deflection bolt.

13. The apparatus of claim 12, wherein said first connection piece further comprises:

a pair of plates, said deflection bolt attaching said plates to one another with said at least one longitudinal element being situated between said plates; and an additional bolt that attaches said plates to one another, said second shackle being coupled to said additional bolt.

14. The apparatus of claim 1, wherein:

said sustaining means for sustaining the deflection angle comprise at least one guide bolt extending in a direction parallel to a direction in which said deflection bolt extends and which is spaced apart from said deflection bolt, said at least one guide bolt being situated closer to said second end region of said at least one longitudinal element than said deflection bolt, said at least one guide bolt resting on an outer surface of said at least one longitudinal element.

15. The apparatus of claim 1, wherein:

said sustaining means for sustaining the deflection angle comprise a pair of guide bolts each extending in a direction parallel to a direction in which said deflection bolt extends and each of which is spaced apart from said deflection bolt, each of said guide bolts being situated closer to said second end region of said at least one longitudinal element than said deflection bolt, each of said guide bolts resting on an outer surface of said at least one longitudinal element, said guide bolts being spaced apart from one another, said first straight portion of said at least one longitudinal element extending from said first end region of said at least one longitudinal element to said deflection bolt passing through a space between said guide bolts, and said second straight portion of said at least one longitudinal element extending from said second end region of said at least one longitudinal element to said deflection bolt passing through the space between said guide bolts.

16. The apparatus of claim 1, further comprising an end stop arranged on said second end region of said at least one longitudinal element.

17. The apparatus of claim 1, wherein said at least one intermediate piece comprises a plurality of longitudinal elements extending next to one another and guided about said deflection bolt.

18. The apparatus of claim 1, wherein said first connection piece comprises a pair of plates, said deflection bolt attaching said plates to one another, and said at least one longitudinal element being situated between said plates such that said at least one longitudinal element bends around only said deflection bolt in said first connection piece.

19. The apparatus of claim 1, wherein said at least one longitudinal element is deflected 180° about said deflection bolt to form said first and second straight portions and such that said first and second straight portions extend in a common direction away from said deflection bolt.

* * * * *